Aug. 15, 1961 M. EISENBERG ET AL 2,996,445
CORROSION INHIBITING ANODE STRUCTURE
Filed Jan. 17, 1958 2 Sheets-Sheet 1
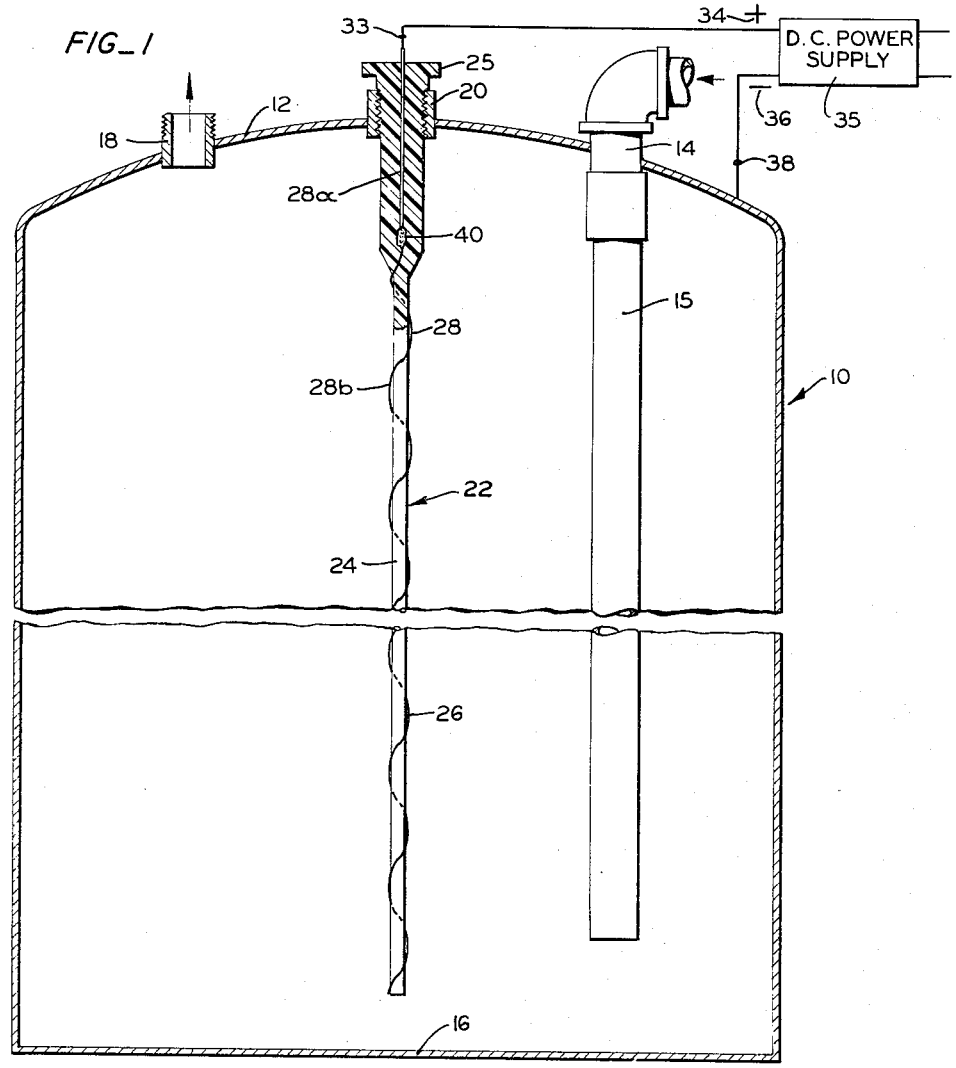
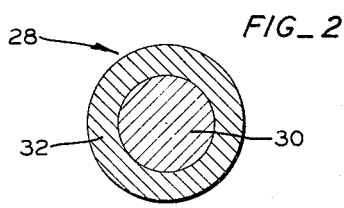
INVENTORS
MORRIS EISENBERG
WILLIAM D. SMILEY
BY
K. A Tauchur

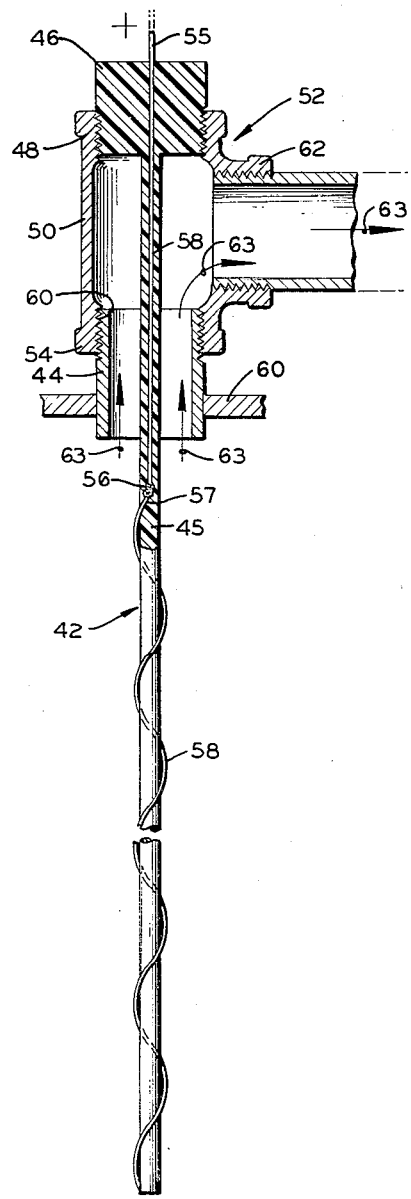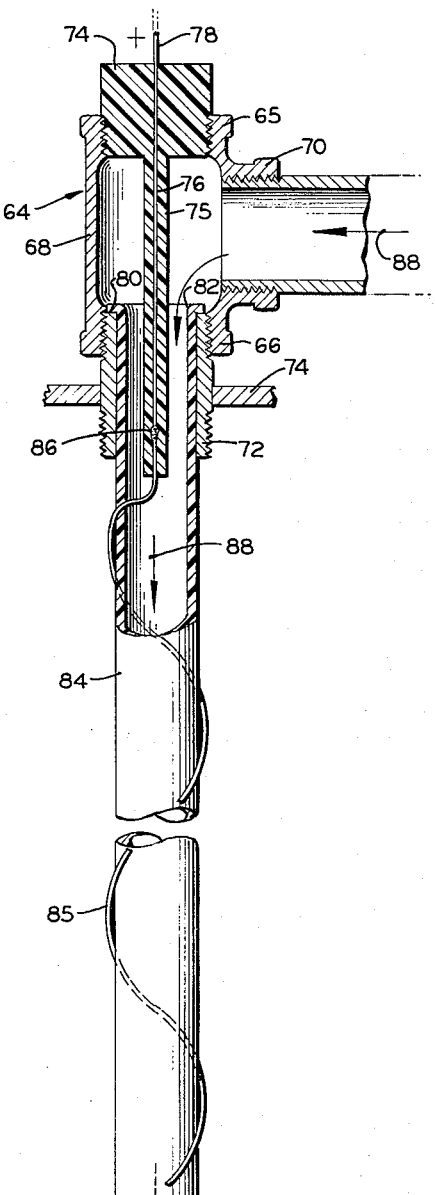

United States Patent Office 2,996,445
Patented Aug. 15, 1961

2,996,445
CORROSION INHIBITING ANODE STRUCTURE
Morris Eisenberg, 307 Diablo Court, and William D. Smiley, 261 Walter Hayes Drive, both of Palo Alto, Calif.
Filed Jan. 17, 1958, Ser. No. 709,681
1 Claim. (Cl. 204—196)

The present invention relates to anode structures of the type employed in metallic water containers, such as storage tanks, boilers and the like, to keep the walls of the containers in a cathodic state and thus inhibit electrolytic and intergranular corrosion of the tank walls. More particularly, the present invention relates to "inert" or "inactive" anode structures, of the type referred to, that are insulated from the walls of the container and are connected to the positive pole of an externally located source of direct current while the tank itself is connected to the negative pole thereof.

The best materials from which inert corrosion-inhibiting anode structures may be constructed are the noble metals, especially platinum and a variety of platinum alloys. The cost of such anode structures, however, is prohibitive in cases where cost is a consideration, such as in boilers and water storage tanks for domestic use.

It is an object of the present invention to provide an inexpensive corrosion-inhibiting anode structure, of the type referred to, that is highly effective in mitigating corrosion and which retains its effectiveness over extended periods of practical use.

Inexpensive materials that are electrically conductive but anodically inert, and may therefore be employed in the construction of anode structures, of the type described, are lead, graphite, aluminum and silicon-iron alloys, and every one of these materials has in the past been used in the construction of corrosion-inhibiting anode structures. However, on account of its poisonous character, lead can obviously not be employed in tanks that are intended for domestic use; also it combines with the minerals contained in the water to constitute lead compounds, such as oxides, hydroxides and carbonates, which contaminate the water and form in time a sludge in the bottom of the tank. Anode structures made from graphite, aluminum and silicon-iron alloys, such as duriron, disintegrate physically within relative short periods of practical use and therefore become ineffective and pollute the water in the process. Thus, a disintegrating graphite electrode imparts a black color to the water in the tank, an aluminum anode forms aluminum hydroxides which produce a white foam, and anodes made from silicon iron alloys form a rust that imparts an undesirable color to the water. Anodes made from aluminum have the added disadvantage that they cover themselves in time with a coat of aluminum oxide, which insulates the anode from the water and thus renders it partially or totally ineffective.

It is a specific object of our invention, therefore, to provide an inexpensive, yet highly effective corrosion-inhibiting anode structure, of the type referred to, that retains its effectiveness over practically unlimited periods of practical use without physical disintegration and without contaminating the water and rendering it unfit for human use.

Another object of the present invention is to provide an effective and inexpensive corrosion-inhibiting anode structure, of the type referred to, which is practically as effective as an anode made from solid platinum and which has all the advantages of a solid platinum anode as to inertness, durability and absence of water contamination.

Still another specific object of our invention is to employ platinum in the construction of anode structures, of the type referred to, in such a manner that the resultant structures have all the advantages flowing from the use of platinum as to effectiveness, durability, and absence of water contamination, and yet are substantially cheaper in cost than corrosion-inhibiting anode structures made from the cheaper materials mentioned hereinbefore.

Furthermore, it is an object of the present invention to produce inexpensive, yet highly effective corrosion-inhibiting anode structures that may readily be installed in existing water containers.

These and other objects of the present invention will be apparent from the following description of the accompanying drawing, which illustrates certain preferred embodiments thereof and wherein FIGURE 1 is a fragmentary, vertical cross section through a domestic hot water tank that is provided with a corrosion-inhibiting anode structure constructed in accordance with our invention;

FIGURE 2 is an enlarged cross-section through a wire that is a component of the anode structure of our invention;

FIGURE 3 is a fragmentary side elevation, partly in section, of an anode structure embodying our invention, which may be applied to a tank through the water outlet opening thereof; and FIGURE 4 is a fragmentary side elevation, partly in section, of an anode structure embodying our invention, that may be applied through the water inlet opening of a tank and serve at the same time as the water inlet pipe thereof.

In FIGURE 1 the reference numeral 10 indicates a tank of galvanized steel, such as may be employed to store and heat water for domestic use. Arranged in the domed top wall 12 of said tank is a threaded bushing 14 through which extends the water inlet pipe 15 to a point a limited distance above the floor or bottom wall 16 of the tank. Likewise arranged in the top wall of the tank at a different point thereof is another threaded bushing 18 which serves as the outlet of the tank and to which may be connected a pipe or conduit (not shown) that conducts the heated water to its place of use.

To inhibit corrosion of the tank walls, the top wall of the tank contains yet another internally threaded bushing 20 which is centrally located; and the anode structure 22 of our invention extends through said bushing into the interior of the tank. Said anode structure comprises a slender, elongated rod 24 of an inert insulating material that will not impart taste, color or odor to the water in the tank, such as a ceramic material or an insulating plastic, for instance, polyvinyl chloride or glass-reinforced polystyrene. At its upper end the rod 24 is radially expanded to form an externally threaded plug 25 that closes the bushing 20 and engages the threads provided in its inner surface. Arranged around the outer surfaces in a long-pitched helix 26, is a thin wire 28 which constitutes the effective part of the anode structure of our invention. Said wire has a core of copper 30 (FIGURE 2) which is completely surrounded by and encased in a thin coat or layer 32 of platinum or a suitable platinum alloy. Near the upper end of the rod 24 a limited distance below the top wall of the tank, the wire 28 passes radially into the interior of the rod and extends upwardly within said rod and through the plug 25 to form a lead 33 which emerges from the top face of the plug. In practical use said lead is connected to the positive pole 34 of a suitable source of direct current which is represented by the block 35 in FIGURE 1 and which may be a battery or a rectifier. The negative pole 36 of said source of direct current is connected directly to the outer surface of the tank, as indicated by the wire 38. In a practical embodiment of the invention serving a tank which has a diameter of 18 inches and a height of 48 inches, the rod 24 should preferably extend to within four inches from the bottom of the tank, and the helix 26 of platinum clad wire should preferably be of a height of from 80% to 90% of the total height of the tank and should be equally spaced from the top and the bottom of said tank. The wire itself may be of an overall thickness of .010 inch having a copper core 30 of .006 inch in diameter and a platinum coat or cover 32 of .002 inch in thickness (FIGURE 2).

When connected to an external source of direct current in the manner explained hereinbefore, the described anode structure is highly effective in mitigating corrosion of the tank walls by keeping said walls in a cathodic state. It is durable and lasts for a practically unlimited period of time, and it will not contaminate the water in the tank in any form. This is due to the fact that the effective component of our novel anode structure is platinum (or any one of the platinum alloys employed in the construction of corrosion-inhibiting anodes), so that it has all the advantages of a solid platinum anode and is therefore far superior in performance and durability to corrosion-inhibiting anodes made from lead, graphite, aluminum and duriron. Yet in spite of its use of platinum as the effective component, the anode structure of our invention is relatively inexpensive and is in fact cheaper than conventional corrosion-inhibiting anodes made from any one of the hereinbefore mentioned inexpensive materials. This is due to the manner in which the platinum is exposed to the interior of the tank, i.e. the fact that it is presented as the thin cover of a very thin wire which is arranged in the form of an axially elongated long-pitched helix exposing for a given minute amount of platinum a maximum of platinum surface in the most effective manner to the surrounding tank walls. This is also due to the fact that platinum, unlike other metals, can carry very high current densities without disintegrating. Hence a small platinum surface area is capable of carrying all the current required for protecting the tank against corrosion, without danger that it may disintegrate.

To effect a further saving in the amount of platinum or platinum alloy used in the construction of an anode structure in accordance with our invention, without reducing its effectiveness, the lead 33 and the major portion 28a of the wire extending within the plug 25 and the upper end of rod 24, may be ordinary copper wire which is soldered to a platinum clad wire portion 28b at a point within the rod 24 as indicated at 49 in FIGURE 1; and after emergence from the side of rod 24, said platinum clad wire portion 28b forms the long-pitched helix 26 around the remaining length of the said rod down to the bottom end thereof.

In the exemplary embodiment of the invention illustrated in FIGURE 1, the water tank 10 is equipped with a solitary, centrally located anode structure embodying our invention. It will be understood, however, that depending upon the size of a tank several such anode structures may be provided and may be located at points other than the center of the tank depending upon its geometrical configuration. Thus, in a hot water tank having a flue that passes centrally through its interior to permit combustion gases to escape from a burner which may be located centrally below its bottom wall, three or more anode structures constructed in accordance with our invention may be arranged at equal intervals around the flue.

Corrosion-inhibiting anode structures embodying our invention may be constructed in such a manner that they may readily be installed in tanks that are already in practical use. FIGURE 3, for instance, illustrates an anode structure 42 embodying our invention, that may be inserted into a tank through its water outlet bushing 44 and may be secured to said bushing without interfering with its function as the water outlet of the tank. The embodiment of the invention illustrated in FIGURE 3 comprises the hereinbefore described slender rod of insulating material, which is now identified by the reference numeral 45, and which forms at its upper end an externally threaded plug 46 that is screwed into, and closes, one end 48 of the cross bar portion 50 of a T-shaped pipe joint 52 such that the rod 45 extends through, and beyond the opposite end 54 of the cross bar portion of the pipe joint. A wire 55 passes centrally through the plug 46 and the upper part of the rod 45 to a point 56 a substantial distance beyond the end 54 of the cross bar portion 50. At this point it is conductively connected to a platinum clad wire 57 that emerges from the rod 45 to form an exposed helix 58 whose upper end lies a limited distance below the top 60 of the tank when the rod 45 is inserted into the tank through the bushing 44. To hold the anode structure of the invention firmly in its proper position within the tank, the end 54 of the cross bar portion of the T-joint may be provided with internal threads that engage external threads arranged in the outer surface of the upwardly projecting end of the bushing 44. In the described arrangement, the water may readily escape from the tank through the bushing 44 around the slender rod 45 and through the stem portion 62 of the T-shaped pipe joint as indicated by the arrows 63, and the end of said stem portion may be provided with internals threads, as shown, so that it can readily be connected to another pipe or conduit that conducts the water to its place of use.

FIGURE 4 illustrates an embodiment of the invention that serves both as the water inlet pipe of a tank and as a corrosion-inhibiting anode structure in the spirit of the present invention and which may be installed in an existing tank in place of its water inlet pipe. Said embodiment comprises another T-shaped pipe joint 64 that has internal screw threads provided in the opposite ends 65 and 66 of its cross bar portion 68 and also in the end of its stem bar portion 70. The end 66 of its cross bar portion is engaged over the upwardly projecting externally threaded end of the bushing 72, in the top wall 74 of the tank, that serves ordinarily to mount the water inlet pipe of the tank. Received within the opposite end 65 of the cross bar portion 68 is an externally threaded plug 74 of insulating material which is provided with a slender centrally located rod-shaped extension 75 that protrudes downwardly to a point below the opposite end 66 of the cross bar portion 68, and in fact below the inner end of bushing 72. Passing axially through said plug 74 and its extension 75 is a copper wire 76 that protrudes above the top surface of said plug to form a lead 78. Suspended from the upper edge or shoulder 80 of the bushing 72 by means of an outwardly directed annular flange 82 is a pipe or tube 84 of insulating material, that extends downwardly into the tank to a point a limited distance above its bottom (not shown), and which carries on its external surface a long-pitched helix 85 of a platinum-clad copper wire. Opposite the bottom end of the rod-shaped extension 75 of plug 74 the platinum-clad wire passes through the wall of tube 84 into the hollow interior thereof and enters the rod 85 and within said rod it is conductively connected to the lower end of the copper wire 76, as indicated at 86.

When secured to the inlet bushing 72 of the tank in the manner explained hereinbefore, the described structure serves not only as a corrosion-inhibiting anode in the spirit of the present invention, but also as a water inlet pipe in that a water supply conduit may be connected to the open end of the stem portion 70 of the T-joint to conduct water through said stem portion, through the lower half of cross bar portion 68 around the rod 75 and through the plastic pipe 84 into the interior of the tank, as indicated by the arrows 88.

While we have described our invention with the aid of certain preferred embodiments thereof, it will be understood that the invention is not limited to the specific constructional details shown and described by way of example, which may be departed from without departing from the scope and spirit of the invention. Thus, while we prefer the use of platinum-clad copper wire for the exposed portions of the wire within the tank because such wire provides utmost economy, it is within the scope of this invention to employ solid platinum wire in cases where cost is not such great a consideration as it usually is in tanks intended for domestic use. We also wish to point out that wherever the following claim calls for the use of platinum, this term is understood to mean not only pure metallic platinum, but to include all platinum alloys that may be employed in the construction of high grade inert corrosion-inhibiting anodes.

We claim:

A combined water inlet and anode structure for domestic water containers for the purpose of inhibiting corrosion of the container walls, said structure comprising a T-shaped pipe joint, a plug of an inert insulating material in one end of the cross bar portion of said pipe joint, a tube of insulating material received in and protruding beyond the opposite end of said cross bar portion, said plug having a rod-shaped central extension passing through said cross bar portion and protruding a limited distance into said tube, a wire extending through said plug and said extension thereof and passing from the end of said extension into and through the wall of said tube to the outer surface thereof, a long-pitched helix formed by said wire around the outer wall of said tube over the remaining length thereof, and a cover of platinum encasing said wire from a point within said extension to and including the remote end of said helix.

References Cited in the file of this patent

UNITED STATES PATENTS

| | | |
|---|---|---|
| 799,061 | Kellner | Sept. 12, 1905 |
| 2,459,123 | Bates et al. | Jan. 11, 1949 |
| 2,508,171 | Kaufman | May 16, 1950 |
| 2,656,314 | Osterheld | Oct. 20, 1953 |
| 2,698,291 | Andrus | Dec. 28, 1954 |
| 2,754,260 | Butler | July 10, 1956 |
| 2,863,819 | Preiser | Dec. 9, 1958 |
| 2,908,623 | Doring | Oct. 13, 1959 |

FOREIGN PATENTS

| | | |
|---|---|---|
| 526,210 | Germany | June 3, 1931 |